United States Patent [19]

Hayes

[11] Patent Number: 4,745,472
[45] Date of Patent: May 17, 1988

[54] ANIMAL MEASURING SYSTEM

[75] Inventor: Norman J. Hayes, Cody, Wyo.

[73] Assignee: Applied Genetics International, Inc., Cody, Wyo.

[21] Appl. No.: 248,824

[22] Filed: Mar. 30, 1981

[51] Int. Cl.$^4$ ............................................. H04N 7/18
[52] U.S. Cl. .................................... 356/107; 356/396
[58] Field of Search ................. 358/93, 107; 119/155; 356/396, 397, 376; 358/106

[56] References Cited

U.S. PATENT DOCUMENTS

| | | | |
|---|---|---|---|
| 3,762,818 | 10/1973 | Johnson et al. | 356/396 |
| 3,902,811 | 9/1975 | Altman et al. | 358/106 |
| 4,089,608 | 5/1978 | Hoadley | 358/106 |
| 4,232,334 | 11/1980 | Dyson | 358/107 |

Primary Examiner—Joseph A. Orsino, Jr.
Attorney, Agent, or Firm—Klaas & Law

[57] ABSTRACT

A system for determining characteristics and traits of an animal-type subject, such as cattle or the like, comprising: an apparatus and method for holding or confining the subject; an apparatus and method for reproducing at least one profile image of the subject and locating specific reference points on the profile image of the subject related to the characteristics and traits to be determined; an apparatus and method for linear measurement of predetermined parts or portions of the subject by use of the specific reference points on the profile image of the subject; and an apparatus and method for utilization of the linear measurements to provide correlation between the linear measurements of a particular subject and other subjects of a like kind.

13 Claims, 6 Drawing Sheets

| GIRTH | REAR FLANK | GIRTH RATIO | HIP HEIGHT | SHLDR HEIGHT | HOCK HEIGHT | SHLDR' WIDTH RATIO | BODY LENGTH RATIO | RUMP WIDTH RATIO | PROFILE RATIO | THURL ANGLE | TSTICLE |
|---|---|---|---|---|---|---|---|---|---|---|---|
| 100.4 | 108.7 | 100.0 | 100.1 | 114.9 | 107.5 | 109.7 | 100.3 | 106.5 | 100.0 | 104.8 | 105.3 |

INDIVIDUAL: GALAXY K-99
REGISTRATION: 78300
TAG NUMBER: J-567
TATTOO: 34201
BREED: SIM SIMMENTAL
SEX: B
BIRTH DATE: 04/18/77
GPI ANIMAL NO: 76210
GPI RUN NO: 452
DATED FILMED: 03/15/80
DATE PROCESSED: 03/21/80

SIRE: GREAT GALAXY (REG. NO. 45012)
DAM: RONA (REG. NO. 9999999)
PROCESSED FOR: 765 KING RANCH

GENETIC PROFILES
P.O. Box 13863
Arlington, Texas 76013

| FRTILTY RATIO | REPRO RATIO | EFFCNCY RATIO | GAIN-ABILITY | | | | | | LOIN RATIO | CARCUS VALUE |
|---|---|---|---|---|---|---|---|---|---|---|
| 106.0 | 100.0 | 103.1 | 107.2 | | | | | | 99.1 | 100.1 |

Fig-5

IN — HERD SUMMARY

6422
KING RANCH
12/30/80
99942

| FERTILITY | | REPRODUCTION | | EFFICIENCY | | GAINABILITY | |
|---|---|---|---|---|---|---|---|
| REGSTR NUMBER | RATIO | REGSTR NUMBER | RATIO | REGSTR NUMBER | RATIO | REGSTR NUMBER | RATIO |
| 159441 | 100.5 | 698555 | 115.2 | 159441 | 108.0 | 770321 | 106.4 |
| 770321 | 100.0 | 159441 | 101.9 | 698555 | 99.2 | 770321 | 101.5 |
| 326091 | 98.3 | 770321 | 97.1 | 326091 | 95.6 | 159441 | 97.6 |
| 302302 | 98.0 | 302302 | 97.0 | 302302 | 95.2 | 302302 | 97.0 |
| 45996 | 97.5 | 325 | 95.3 | 557 | 95.1 | 4199 | 96.5 |
| 965841 | 96.0 | 4199 | 95.2 | 847900 | 94.5 | 325 | 96.1 |

Fig. 6

ANIMAL MEASURING SYSTEM

BACKGROUND AND SUMMARY OF INVENTION

This invention relates generally to a system for evaluating the physical and genetic characteristics of animals; and, more particularly, the physical and genetic characteristics of beef cattle.

For many years cattlemen have attempted to evaluate the characteristics of beef cattle in order to select animals of highest productivity as measured by their breeding characteristics and their ability to produce meat, milk, and the like. Over the years, various persons have devised various methods of evaluating such characteristics. Such methods may or may not have been based upon scientific analysis and study. At the present time, the economic survival of most cattlemen depends upon efficiency in operation. Thus, the cattlemen must not only select the best possible animals for breeding purposes; but, also select the best feed, the amount of feed, and determine which animals to slaughter and when to slaughter such animals. One non-productive animal can cost a cattleman a substantial amount of money over a relatively short period of time.

The primary object of the present invention is to enable accurate selection of cattle for growth and mating through use of scientifically controlled correlated measurements of physical characteristics. In general, the invention comprises the use of an electronic measuring means, such as a plurality of television cameras, which are arranged and located in a manner to provide individual animal output measurement signals, accurately representative of the profile and physical structure of a particular animal, which are transferable to a suitable recording means, such as a video tape system. The individual animal measurement signals are then utilized with a conventional computer in which standard animal measurement data of like kinds of animals is stored. The individual animal measurement signals are compared with the standard animal measurement data to generate output data which may be transcribed onto printed materials by conventional print-out means.

In order to make the present invention generally available to all cattlemen, the system must be adaptable to use at the location of the cattle such as at farms, feedlots and ranches. Thus, I have developed a portable measurement system capable of being transported from one location to another by use of a vehicle such as a van or truck. The portable measurement system comprises a special chute apparatus for holding the animal during measurement, a pair of portable television cameras and a video tape system for recording the measurement data on video tape which can be sent to a central computer processing station for providing the desired information about a particular animal.

In general, the chute apparatus comprises a rectangular box having an entry gate at one end and an exit gate at the other end with a conventional head catch mechanism associated therewith. The front side of the chute apparatus comprises a viewing wall made of a gridwork of steel rods or a translucent material such as plastic having grid-lines located thereon. The top side of the chute apparatus comprises a similar viewing wall. The back side of the chute apparatus comprises a solid plate or the like which will enable the side profile of the animal to be readily outlined before a television camera. The chute apparatus may include weighing means at the bottom of the chute to weigh the animal and sloped abutment means to cause the animal to stand in the center of the chute apparatus in an upright position. A first television camera means is located a predetermined distance in front of the side profile viewing wall and a second television camera means is located a predetermined distance above the top profile viewing wall. The television cameras are connected to a portable video tape recording system having suitable controls to select image signals from either one of the television cameras and record those image signals.

BRIEF DESCRIPTION OF DRAWING

FIG. 5 is data card generated from the linear measurements of a particular card; and, FIG. 6 is an in-herd summary sheet of data generated from the linear measurements of animals of a particular herd.

DETAILED DESCRIPTION

Figure 1:
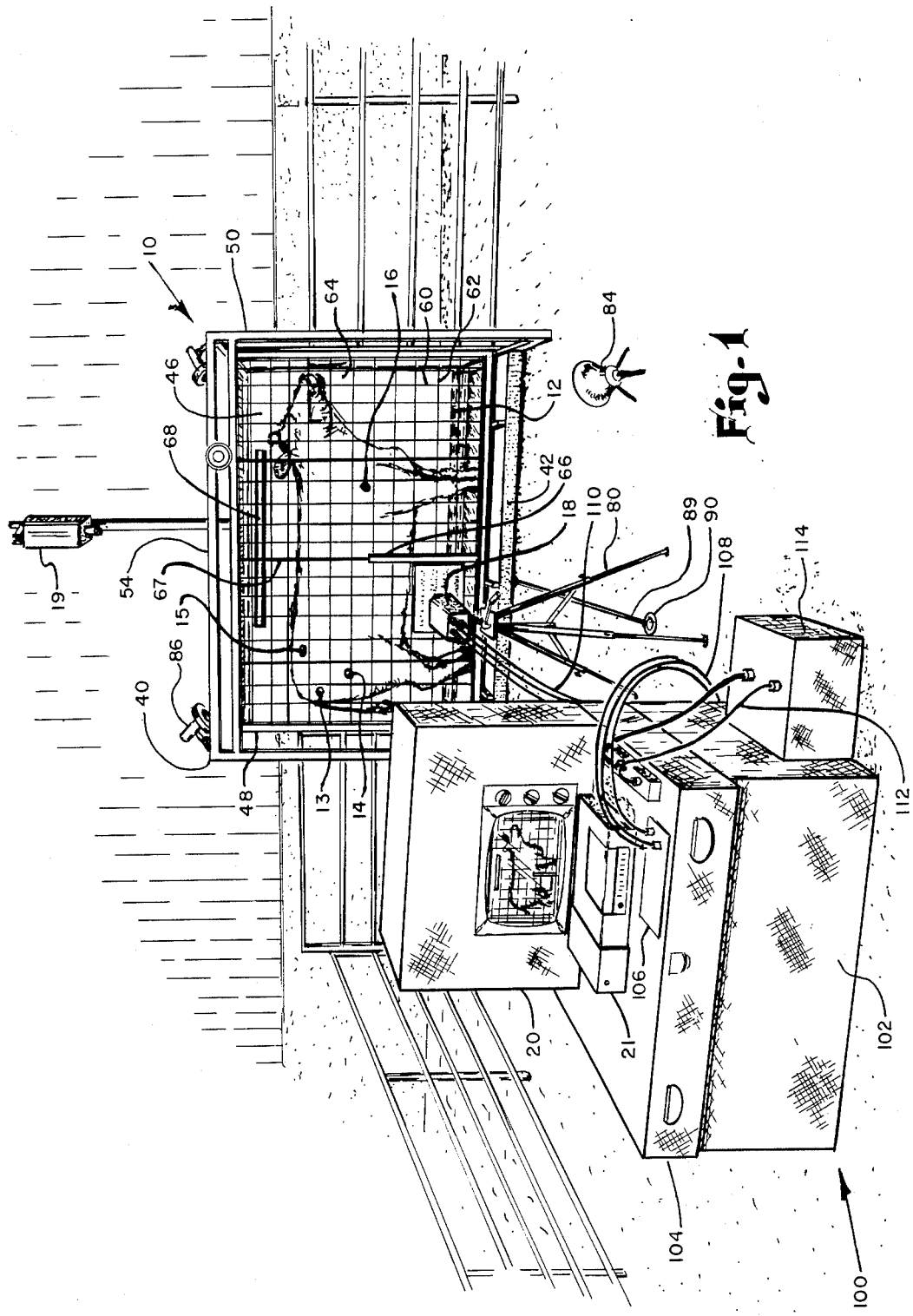
FIG. 1 is a schematic perspective view of an animal profile recording system.
Figure 2:
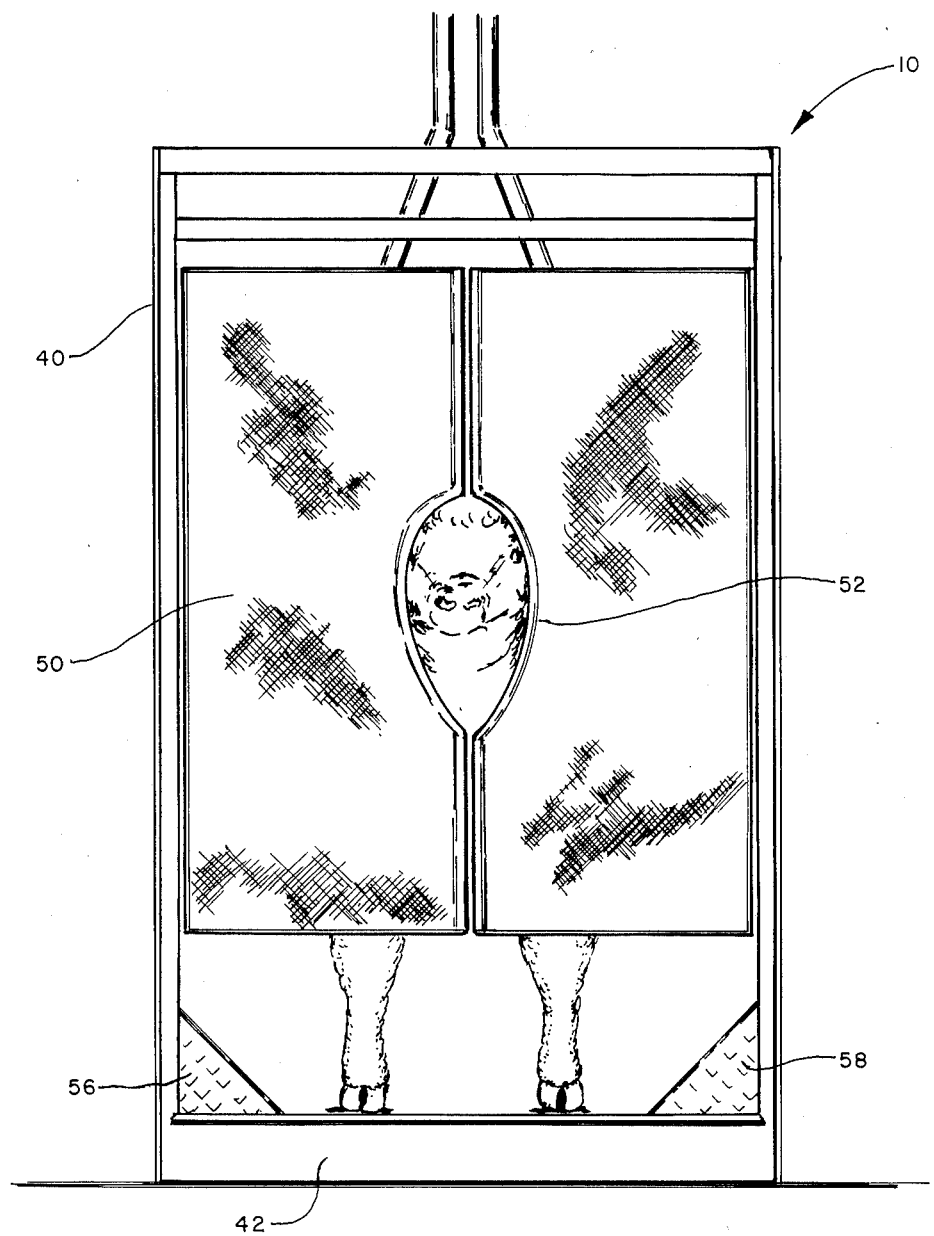
FIG. 2 is an end view of a cattle chute shown in FIG. 1.

In general, the system of the present invention comprises animal profile recording apparatus as depicted in FIG. 1 and animal profile measurement apparatus as depicted in FIG. 2. The animal profile recording apparatus comprises chute means 10 for holding an animal in a relatively narrow width passage 12 in an upright standing position; marking means 13, 14, 15, 16 applied to the animal at various locations, such as the point of the front shoulder, forward edge of the hook bone, stifle muscle protruding from side of rear leg, and point of hip socket, for providing specific reference points for obtaining measurement data; a first side profile image generating means, in the form of a television camera 18, for providing an accurate outline of the side profile of an animal in the form of a video image of the animal; a second top profile image generating means, in the form of a television camera 19, for providing an accurate outline of the top profile in the form of a video image of the animal; an image viewing means, in the form of a television screen display console 20, for viewing images generated by the camera means; and an image storage means, in the form of a video tape recording device 21, for separately recording the side and top profile images of the animal on video tape for subsequent use at a data processing center. The animal profile measurement apparatus comprises an image display means, in the form of a video receiver and display unit 22 operable by the video tape apparatus 23, for displaying the side and top profile images of the animal on a viewing screen 24; a measuring means 25 associated with the viewing screen for generating measurement data from the side and top profile images; and a digitizer means 26 for transmitting data to and from a computer means 27 for recording of the data for a particular animal and correlation and comparison of the individual animal data with compliations of prior obtained data on the same animal and/or with other animals of a like kind; data entry means 28 for inputing data to the computer means and print-out means 29 for generating printed documents 30, 31, FIGS. 5 and 6, or the like containing relevant information about a particular animal or a group of animals.

The chute means 10 comprises a rectangular support frame 40, a bottom weighing platform 42, an open mesh front side wall 44, a solid rear side wall 46, an entry end gate 48, an exit end gate 50 with a head catch mechanism 52, and an open mesh upper side wall 54. A pair of downwardly inwardly inclined plate members 56, 58 are mounted on opposite sides of platform 42 adjacent the front and rear walls to cause the animal to stand in the center of the chute. Front and upper side walls 44, 54 are each constructed of laterally and longitudinally extending metal rods 60, 62 to provide a calibration grid work comprising a plurality of relatively large regularly spaced six inch squre shaped openings 64. A central reference marking 66 of predetermined length, such as white paint, is applied to center rod 67 of wall 44. A second reference marking 68, such as white painted rod of predetermined length is mounted on the rear wall 46. In operation, the animal to be measured is placed in the chute through entry gate 48 and, if necessary, the head of the animal is temporarily caught in head catch mechanism 52. Adhesive markers 13, 14, 15, 16, such as circular white plastic members with adhesive backing, are applied to selected reference points on the side and top of the animal facing the screens 44, 54. The animal is then allowed to stand freely or held by a head catch in the chute in a vertical upright position during video taping of the animal profiles and discharged from the chute through the exit gate 50.

The side view television camera 18 is placed on suitable support means, such as a tripod device 80, a predetermined distance in front of front wall screen 44 in alignment with the center line mark 66 on front wall 44 so that the camera lens is vertically and horizontally centered relative to the wall 44. The top camera 19 is located a predetermined distance above and in centered alignment with the upper wall 54 on a support bracket means 82 mounted on frame 40. In this manner, the video image of the animal has a predetermined relationship to the calibration grid work provided by rods 58, 60 to enable generation of very accurate measurement data. Suitable lighting means 84, 86 may be provided to illuminate the animal. Then the image of the animal generated by the television cameras is monitored on a display screen and any required set-up adjustments are made to obtain the required images. A black rectangular border 88, FIG. 3, may be provided on the screen to enable alignment by locating the calibration grid work therewithin. A locating device, such as a rope 89 with a ring 90 may be used to assist in locating camera 18. When all is ready, the front and upper cameras are sequentially operated for a relatively short period of time (e.g., approximately five seconds or 150 frames) and the images are recorded on video tape. The film segments are suitably identified and related to the animal in the chute such as by an identification board 91 mounted on the front wall grid work. Then the animal in the chute is released and another animal may be placed in the chute. In this manner, a large number of animals of a particular herd at a particular farm or ranch or feedlot location may be video taped in a relatively short period of time at a relatively low cost.

Thus, the profile recording system consists of two main components which are a specially designed cattle measuring chute 10 made from heavy duty welded parts and a portable video taping system which allows usage indoors, such as in a barn, or outdoors, such as in a pen or field, at the location of the animals. The video system may be housed in a specially designed case 100 and completely protected and easily transported to any location. The carrying case consists of two parts. A bottom part 102 carries the video console; and, a lid part 104 contains all ancillary equipment. The lid also may serve as a table for the control console comprising video monitor 20, color video cassette recorder 21, video switcher 106, and connector cables 108, 110, 112. The system features a special power pack 114 that allows utilization of normal 110 volt current or 12 volt DC from a ranch or farm vehicle to power the entire system. The components carried in the lid of the carrying case include the two high resolution monochrome television cameras 18, 19. These cameras are equipped with specially matched lenses for distortion free pictures. The system uses 6-hour reusable video cassette tapes each of which is capable of providing enough time to record the measurements of more than 1,000 cattle.

To set up the system, the side profile camera tripod 80 is placed approximately 10 feet from the chute. The side profile camera is mounted on the tripod with a simple screw attachment. The cables are connected to their corresponding receptacles with a simple bayonet twist lock. Once all the cables are connected, the camera is energized and allowed to warm up for a few moments. The top profile camera 19 is mounted, connected, and energized in a similar manner. The premarked power and camera cables are plugged into the appropriate receptacles on the video console to provide a mini-television studio for recording the genetic profile of animals. Total set up time is under fifteen minutes.

Figure 3:
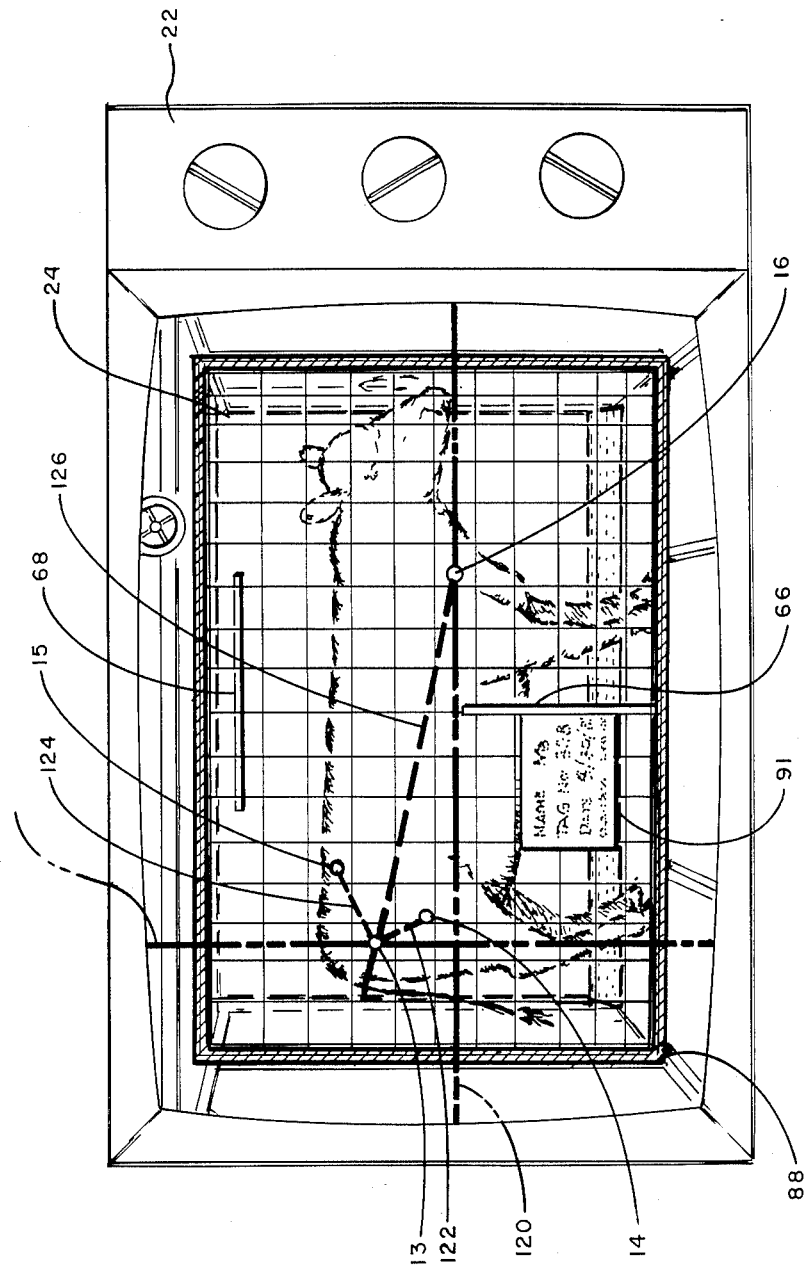
FIG. 3 is a side elevational view of a viewing screen of a television image display console.

To start up the system, the operator turns a power switch on and turns on the video recorder, the power pack, and the video monitor. A video tape cassette is inserted into the recorder. Then the field of view of the cameras is checked. The top profile camera is pre-positioned for a proper field of view when properly mounted on the bracket on the chute. In the illustrative embodiment the side profile camera must be positioned by the operator for the proper field of view which is when the total grid of the chute is seen within a boarder marked by a black line 88 on the sides, top, and bottom of the video monitor as illustrated in FIG. 3. The centering line 66 must be located in the center of the monitor as indicated in FIG. 3. A location fixture 89, 90 may be provided to assist in positioning of the side profile camera. Once both cameras are positioned and operating correctly, the system is ready to begin recording the profiles of an animal.

The animal to be measured is brought into the chute which allows the animal to stand in a natural position necessary for correct evaluation. The measuring procedure is silent and motionless so the animal remains at a normal stance. The measuring system is based on interpretations of skeletal dimensions. This requires the identification and marking of critical points of the animal with locators that are adhesively attached to the animal. The four specific points can easily be located by touch. Any one can be taught to correctly position the locators 13-16 in a few minutes. The points marked are the hook corner of the pelvic bone; the thurl joint which is the socket where the femur bone and the pelvic bone connect and is easily located by cupping the socket with the palm of the hand; the outer most portion of the stifle;

and the point of the shoulder. A reference marker (not shown) may be placed on the top of the back to assist to calibrate the top profile but is usually unnecessary. Once the four side skelatal points are identified and marked, the animal profile is ready to be recorded. The video tape recorder is activated by pushing a record mode button on the panel. A side profile button is pressed to actuate the side profile camera and the monitor is checked to make sure the animal's number is clearly visable on the identification board. As soon as the animal is standing correctly, the record button is pressed for approximately five seconds and the video tape records the side profile of the animal at the rate of thirty frames per second to produce approximately 150 total frames, but only one good frame is needed and used in the measurement of the animal, to allow for slight movement by the animal. Once the side profile has been recorded, an over-head camera button is pressed to activate the top profile camera. When the animal is standing correctly, the top profile is recorded for approximately five seconds. The total profile recording operation from beginning to end should take less than two minutes per animal. The locators and reference markers are removed and the animal is released.

After completion of the filming of an animal or a group of animals, the video tape recording of the animal is sent to an analysis and data processing center whereat the relevant data is generated from the video tape. The first step in the data generation process is to sequentially display the side and top profiles of the animal on a video receiver screen. The images include the measuring grid provided by rods 58, 60 and the reference markings on the animal and the chute.

Figure 4:
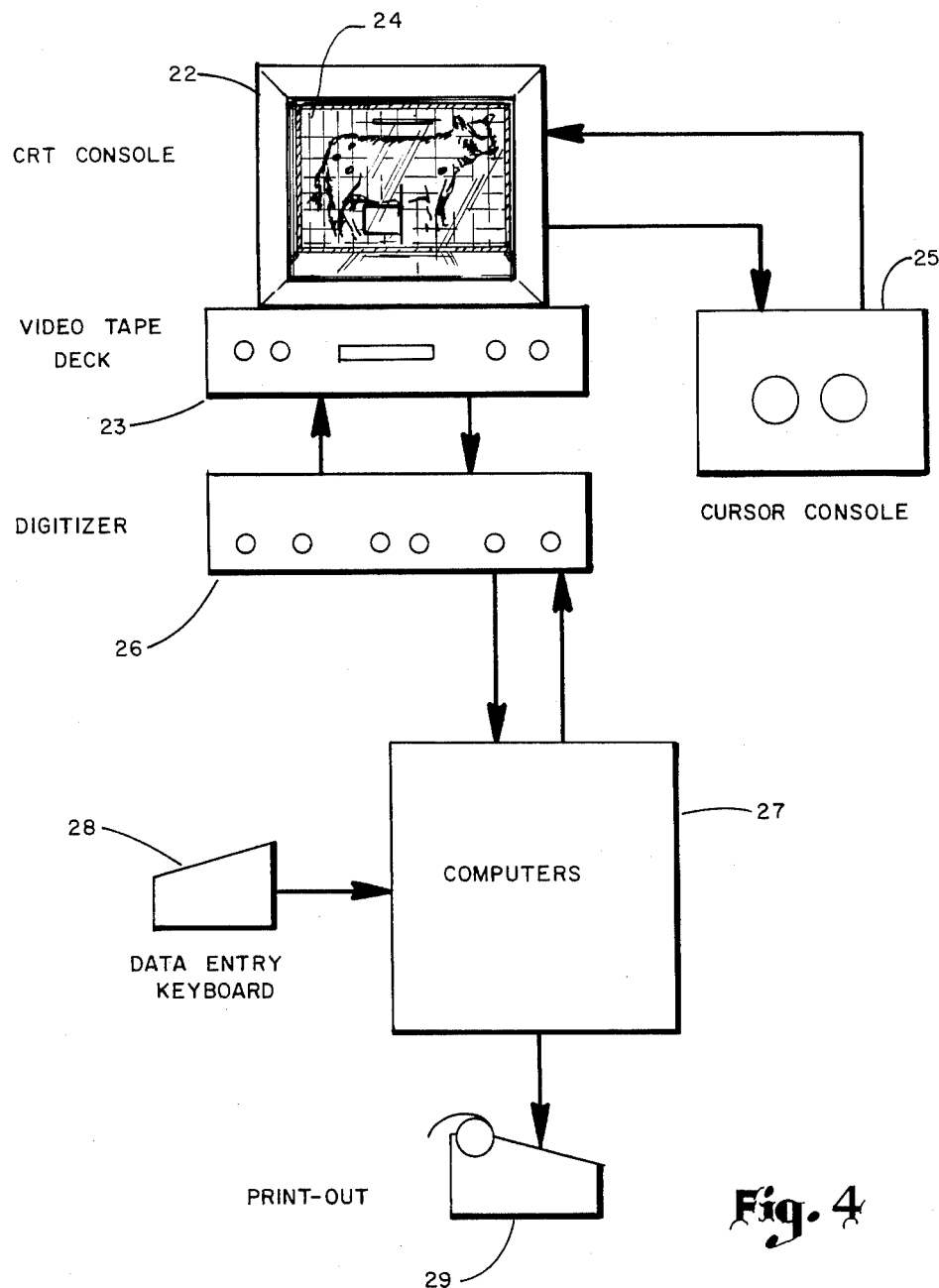
FIG. 4 is a schematic diagram of apparatus for measuring physical characteristics of an animal from a profile image of the animal displayed on a viewing screen of a television image display console.

The video tape of the cattle, along with a profile sheet, is received at the computer center and logged for processing. A data sheet is included with the system and must be filled out with the necessary information such as breed type, sex, weight, date of birth, and tag or registration numbers to allow each animal to be matched with the identification number appearing on the video tape. The tape is inserted in the computer controlled video playback machine 22, FIGS. 3 and 4. The information from the data sheet is entered into the computer through data entry means 28 to activate a measuring program for a particular herd and breed.

After selecting the frame of the video tape to be measured, horizontal and vertical cursor lines 120, 122, FIG. 3, which do the actual measuring, are sequentially positioned at the measuring points 13-16. The computer is instructed to begin the measurement process. All side profile measurements are taken with the cursor lines and stored in the computer. This is an extremely accurate method of making linear measurements which eliminates any inaccuracy due to animal movement or human error. Research has shown that the repeatability of the measurements approaches 100 percent.

The top profile measurements of the animal are computed in a like manner. These measurements are then stored in the computer. The computer confirms the accuracy of all measurements by connecting the measuring points on the animal by reference lines 122, 124, 126, FIG. 3. This allows the computation of certain angles which are indicators of genetic traits. The connecting lines are then entered into the computer and the electronic translation of all data begins.

The final step in the linear measurement process is done by digitizer 26 which translates the video coordinates into numerical data at the main bank of computers in process. Each dot on the video screen represents 1/4900th of the total area and are utilized as reference points in the measuring process. This is the reason for the extreme accuracy of the measurements. After all the cattle in a herd have been measured, the data is sorted, calculated, and rated in a matter of seconds. A dual printout, FIG. 6, containing the measurements of the cattle, ranking each one within the herd and within the breed is printed. Individual computer cards, FIG. 5, listing the individual measurements of each animal and the rating of each genetic trait are provided. Once the data is printed, it is assimilated and returned. The information includes an in-herd summary ranking each animal according to the four primary genetic traits: fertility, the ability to breed and conceive, reproduction, the ability to produce a live calf, efficiency, the efficient utilization of feed in relation to weight gain and gainability, the ability to gain weight. The information consisting of the herd summary, breed summary, and a profile card on each animal is then sent to the animal owner.

As shown in FIG. 3, the chute grid lines are reproduced on the computer monitor for calibration and synchronization of the computer. A color outline of the animal can be reproduced by the computer monitor in order to determine the surface area in square inches of the animal on a side profile or a top profile.

In the presently preferred arrangement, the side profile camera is located by rope 89 attached to the chute 40 which has a ring 90 on the end to be centered over an "X" mark on top of the camera whereby the camera is always in the same position each time the camera is set up. A camera switching unit is associated with the monitor console control panel to switch between the overhead camera and the side profile camera either automatically or manually.

The side profile grid work is movable laterally inwardly and outwardly and includes a sliding door that will enable the placement of markers on the animal without reaching through the grid work.

A white marking is placed on the back wall for calibration reference purposes. Thus, there is both a vertical reference line in the center of the chute; a horizontal reference line on the back of the chute; and, 6-inch square grid reference marks which are used for paralex correction in the computer on the animal measurements because each grid mark or square covers a different increment of hide on the animal according to the paralex of the camera.

The method of determining the distance of the overhead camera from the animal is taken from the side profile. Since the center reference line has a given heighth; and, on the center line, the grid spaces have an accurate 6-inch increment the height of the animal may be accurately determined and the distance of the top profile camera from the top of the animal may be determined by subtraction of known distances to select a computer chip that has the correct paralex factors for measuring the top of the animal at that distance.

The digitizer 26 is constructed and arranged to do the selected measurements of the animal; record them on a television screen; and interconnect reference points by lines to provide angles and distances.

A suitable set of operating instructions are provided for display on the computer console screen so that all measurements are properly made and recorded in the computer.

The measurements are made by use of conventional horizontal/vertical cursor lines and/or use of the pitcal dots with a control dot which may be moved to any location by the use of conventional control devices such as two knobs that vary the vertical and horizontal location of the control dot.

The one control dot can be put in the center of the locator devices on the animal in a more precise manner than the cursor lines. Once the image of side or top profile of the animal is displayed on the computer console screen, the computer is open for a calibration. The method of calibration is first to measure along the center line from the floor up to the top of the center white line which is preset at approximately 36 inches in the illustrative embodiment. This is entered and the computer is instructed to calibrate for vertical measurements. Then the distance from that point to the back bone of the animal is measured by placing the horizontal cursor on the top of marker 66. The computer is programed to provide a measurement of the balance of the distance on the heighth of the animal. In addition, once the height of an animal is determined, the distance from the top of the animal to the top camera may be automatically calculated to provide a base for the calibrations of all the top profile measurements.

Any parallax problem with the side profile may be corrected by use of the horizontal mark on the back of the chute because it is of a known length and the spacing of the 6-inch grids are also a known value. Thus variations in animal width causing variations in profile distance to the cameras cause automatic adjustments in the computer. All of these computations are loaded into the computer before the linear profile computations in distances and lengths are made so that those variations are all corrected prior to loading the main data into a larger computer for analysis.

Relatively large variations in the size of animals are not of any concern because animals less than ten months of age will not be of general interest. Only animals of a certain size, probably six to seven hundred pounds on up will be measured by the illustrative system. There is a gun sight square welded on the front of the chute in the center of the chute with an "X" mark in it. That gun sight square is located in the middle of the belly or stomach center portion of the animal for the side profile picture. This is done by either animal movement or horizontal camera movement.

Next the various connecting lines are electronically drawn on the screen by the computer to connect the marking dots on the image of the animal. The program is such that all of these lines must be completed before the operator finishes measuring an animal. The computer will instruct the operator to go back and finish any measurement or operation which has not been completed. The interconnecting lines are stored on a floppy disc so that any of the measurements ever taken on a particular animal are available at a later date.

The lines 122, 124, 126 that appear on the computer console screen are drawn in the following manner: the cursor is placed on the shoulder bone marker and an input signal is sent to the computer, then the cursor is moved to the pin bone and an input signal is sent to the computer, then the computer causes a line to be drawn between those two points and records that line and the distance. So, it records not only the distance, but also a permanent line that records what linear measurement was taken and the distance. Thus, if the operator makes a mistake, the original calculation lines can be placed back on the screen to determine if there was a procedural error.

The computer is programed to enable the outline of the animal on the computer screen to be identified by a color, which is in contrast to the chute background color and the color, so that the area of the color image of the animal can be measured in square inches.

An attachment may be provided to allow either manual erasure or addition of color profile area to the picture. For example, the head and leg portions of the animal may be removed to enable measurement of only the body portion (carcass) of the animal.

The data generated by the system may be used to establish and predict characteristics and traits of each animal; including, without limitation, fertility, efficiency, gainability, reproduction. All of the traits to be measured are based upon correlations related to the measurements that are taken. At the present time, there are fourteen measurements on females, and fifteen on males. These measurements are used statistically to develop standard curves and the measurements of particular animals are plotted against the standard curves of a like kind of animal. Then the individual animal traits are weighted according to the correlation that comes from the comparison information in the computer.

Some of the key things in fertility is the angle of the thurl joint, the relationship of the girth to the flank which should always be greater than the girth on a female and just the opposite on a male. The width of the hip in relationship to the length of the hip which is measured from the hook locator position to the pin locator position; and the width of the hip from stifle joint to stifle joint and a straight line through the animal. The shorter the length of the hip compared to the width of the hip, the more fertile the animal.

For reproduction, one of the key things is the angle of thurl. The steeper the angle, the easier the reproduction will be or the easier calving the animal will have because of the pelvic area being in a direct line with the birth canal.

Efficiency is the measurement of conversion of feed based upon such factors as width, length, weight, height ratio of an animal. It has been determined that the wider the animal is to a given point compared to its length and its heighth the more efficient it will convert feed. Once it passes that extreme point, a wider animal will start building fat instead of converting feed to red meat so that economical conversion is reduced. Gainability is known to be correlated to the heighth of the animal; but, it is desirable to balance gainability with the efficiency of the animal so all of the efficiency measurements should be taken into consideration with the gainability.

The reproduction factor on a male is directly related to the thurl joint which is an inheritable characteristic. The most important inheritable characteristics known today are the size and shape of the carcass and the construction and arrangement of bone structure, the animal-muscle structure which is approximately 65 to 70 percent inheritable and would be transmitted to offspring from the male and female.

The method of computation for any chosen trait category is based upon the individual measurements for a particular animal as compared with average measurements for like kinds of animals which are used to create an average which is designated to be equal to 100 percent. The measurements of a particular animal above average may be expressed as 101, 102, 103 percent, etc. and below average measurement as 99, 98, 97 percent, etc. These differences may be expressed on a card or data sheet to provide ratio measurement of a particular animal so that a ten month old animal can be compared with a three year old animal by a computation which corrects data for differences in age to eliminate distortions in growth curve based upon age.

While the general inventive concepts have been described in connection with illustrative and presently preferred embodiments thereof, it is intended that other embodiments of these general concepts be included within the scope of the claims of this application and any patent issued therefrom except to the extent precluded by prior art. For example, the number of traits or characteristics of animals and the manner and methods of determining such traits or characteristics may be expanded or contracted depending upon the purposes intended and the state of knowledge with respect thereto. It is contemplated that use of the present system will enable a great expansion of knowledge with respect to the correlation between measurable characteristics of animals and expected or predictable characteristics and traits of animals and their offspring. While the general concepts of the invention have been illustrated and described by reference to a particular kind of animal, i.e., cattle, it is to be understood and it is contemplated that the general concepts may be applied to other kinds of animals such as dogs, horses, pigs, chickens, etc. and human beings for any worthwhile purpose.

What is claimed is:

1. A system for measuring preselected physical dimensions of an animal comprising:
   a chute means for confining the animal in a vertical upright standing position;
   a first side wall means associated with said chute means for enabling viewing of a side profile of the animal and measurement of dimensional characteristics of the animal;
   a top wall means associated with said chute means for enabling viewing of a top profile of the animal and measurement of dimensional characteristics of the animal;
   a first image receiving means located opposite to and in predeterminal spaced relationship to said side wall means for recording a side profile image of the animal and said side wall means;
   a second image receiving means located opposite to and in predetermined spaced relationship to said top wall means for imaging a top profile of the animal;
   an image reproducing means communicating with said image receiving means for reproducing the said profile image and top profile image of the animal; and
   linear measurement means associated with said image reproducing means for measuring predetermined linear physical characteristics of the animal.

2. A system for determining genetic traits and growth or the like characteristics of an animal comprising:
   a chute means for confining the animal in a vertical upright standing position;
   a first side wall grid means associated with said chute means for enabling viewing of a side profile of the animal and measurement of dimensional characteristics of the animal;
   a top wall grid means associated with said chute means for enabling viewing of a top profile of the animal and measurement of dimensional characteristics of the animal;
   a first image recording means located opposite to and in predeterminal spaced relationship to said side wall grid means for recording a side profile image of the animal and said side wall grid means;
   a second image recording means located opposite to and in predetermined spaced relationship to said top wall grid means for recording a top profile image of the animal and said top wall grid means;
   an image reproducing screen means for reproducing the recorded side profile image and top profile image of the animal including the top and side wall grid means associated therewith; and
   linear measurement means associated with said image reproducing screen means for measuring linear physical characteristics of the animal.

3. The invention as defined in claim 2 and further comprising:
   means connected to said linear measurement means for receiving input signals representative of linear measurements of the animal and comparing and correlating the linear measurements of the animal with other linear measurements of the same animal and other animals of a like kind and breed.

4. The invention as defined in claim 3 and further comprising:
   cursor line generating means associated with said image reproducing screen means for measuring linear physical characteristics of the animal.

5. The invention as defined in claim 4 and further comprising:
   area measuring means associated with said image reproducing screen means for measuring the area of the side and top profiles of the animal.

6. The invention as defined in claim 5 and further comprising:
   skeletal location marker means mounted on the animal for inclusion in the recorded side profile image and the top profile image and for reproduction by said image reproducing screen means in association with the top and side wall grid means.

7. The invention as defined in claim 6 and further comprising:
   reference marker means on said chute means for locating said image recording means relative to said top and side wall grid means.

8. The invention as defined in any preceding claim and wherein said first and second recording means each comprising:
   a video camera and a video tape recording device connected to said video camera for producing a video tape of the side and top profile images of the animal including the side and top wall grid means and the bone location marker means and the reference marker means.

9. The invention as defined in claim 8 and wherein said image reproducing screen means comprising:
   a video tape operable screen means for reproducing the images recorded on said video tape.

10. The invention as defined in claim 9 and further comprising:
    a data print-out means operably connected to said computer means for providing a printed document containing genetic, growth and carcass data based upon linear measurement of the side and top profile images of the animal.

11. The invention as defined in claim 10 and further comprising:
   weigh means associated with said chute means for weighing the animal.

12. The invention as defined in claim 11 and further comprising:
   a pair of spaced parallel inclined wall means in said chute means for causing the animal to stand in a vertical upright position in the center of said chute means.

13. A method of measuring the physical characteristics of an animal and providing an analysis of comparative values between the animal being measured and a standard measurement of such values for other animals of a like kind, comprising the steps of:
   (a) confining the animal in a pen in a vertical upright essentially non-movable standing position;
   (b) placing a first T.V. camera in a first position at substantial right angles to one side of the animal and generating signals representative of the side profile of the animal;
   (c) placing a second T.V. camera in a second position at substantially right angles to the top side of the animal and generating signals representative of the top profile of the animal;
   (d) recording the signals generated by said first and said second T.V. camera;
   (e) comparing the signals generated by said first and second T.V. cameras with standard signals representative of standard measurements of other animals of a like kind and generating control signals representative of differences therebetween; and
   (f) causing a print-out of data representative of the differences in linear measurements between the animal being measured and the standard values for other animals of a like kind.

* * * * *